United States Patent

[11] 3,607,646

| [72] | Inventor | Henry de Roissart<br>Grenoble, France |
|---|---|---|
| [21] | Appl. No. | 812,696 |
| [22] | Filed | Apr. 2, 1969 |
| [45] | Patented | Sept. 21, 1971 |
| [73] | Assignee | L'Air Liquide, Societe Anonyme pour<br>l'Etude et l'Exploitation des Procedes<br>Georges Claude<br>Paris, France |
| [32] | Priority | Apr. 4, 1968 |
| [33] | | France |
| [31] | | 147,053 |

[54] METHOD FOR THE PRESERVATION OF ANIMAL OR HUMAN ORGANS IN LIVING CONDITION
12 Claims, 1 Drawing Fig.

[52] U.S. Cl. .................................................. 195/1.7,
195/127, 62/306

[51] Int. Cl. ...................................................... A61r 17/00
[50] Field of Search .......................................... 195/1.7

*Primary Examiner*—Richard L. Huff
*Attorney*—Lee C. Robinson, Jr.

ABSTRACT: A method and apparatus is described, pertaining to the preservation of living tissue such as an organ excised from the body for an extended time in view of future transplant thereof. The organ is placed in a refrigerated environment and under pressure while a nutrient fluid is circulated through its arterial complex. The gas utilized for pressurizing the environment of the organ is biochemically inert and serves as a carrier of oxygen which is absorbed by the nutrient, the latter being subjected to the influence of the pressurizing gas.

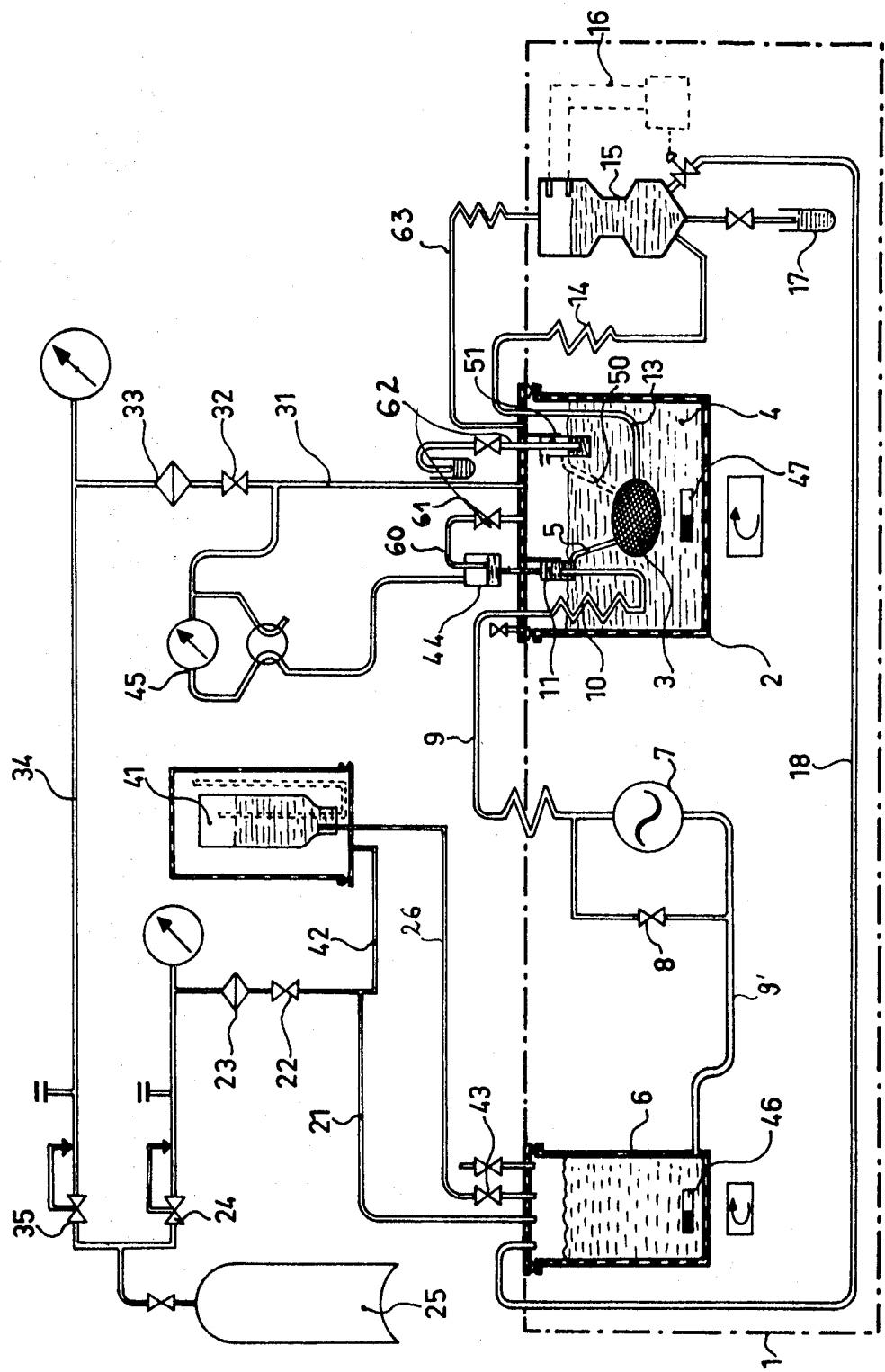

METHOD FOR THE PRESERVATION OF ANIMAL OR HUMAN ORGANS IN LIVING CONDITION

This invention pertains to the science of biology and more particularly to methods for accomplishing certain endeavors in the field of preservation of living tissue.

It is a well-known fact that the preservation of live animal or human organs, such as the kidneys, heart, liver, etc. ..., excised from the body with a view to transplant, is favorably assisted by a number of factors.

One of these is that the organ to be preserved must be maintained in an environment of low temperature, below 37° C., in order to lessen all metabolic activity. Another requirement is that the organ be supplied with a fluid containing basic nutrient elements as well as oxygen.

A third requirement is that of a pressurized or hyperbaric environment in which the organ is subjected to a pressure in the neighborhood of two to 15 bars or more above that of the atmosphere. It has been established that oxygen under pressure favors preservation of an organ, particularly if it is combined with refrigeration and infusion of a nutrient.

However, the exclusive, or at least main, means employed to ensure an hyperbaric environment has always been oxygen which is also used to oxygenate the nutrient infusion or perfusion liquid to maximum. When this was not so, e.g. when using a gas composed of nitrogen and oxygen to oxygenate the nutrient perfusion liquid, care has always been taken to use dissolution pressures which were sufficiently high to ensure that the perfusion liquid would contain at least four volumes percent of dissolved oxygen. This currently employed practice is the result of the generally accepted theory that the organ being preserved needs the maximum amount of this indispensable element. However, in spite of all the devices and precautions taken, the preservation life of an excised organ is still very limited, around 10 to 20 hours maximum.

One aim of the present invention is to improve considerably the survival time of a living organ by the combination of low temperature, perfusion and hyperbaric environment, used according to a certain number of operating conditions.

Basically, it was assumed that failures might be caused by the toxic effect of excess oxygen in the tissues, such excess being inevitable when pure oxygen or a high percentage oxygen mixture was being used as the hyperbaric agent or for the oxygenation of the perfusion liquid, and one of the features of this invention is that, in a method of type being discussed, the oxygen supply to the said organ is set to the level required for the survival of the said organ, by means of a pressurized gas consisting essentially of a biochemically inert gas of high permeation factor and low oxygen content, at least under 10 percent by volume, such a gas being dissolved in the perfusion liquid and also possibly being the means by which the environmental medium of the living organ is placed under pressure. The appropriate quantities of oxygen must be decided for each individual organ, and care must be taken not to feed the living organ with more than a limited supply of oxygen, in any case much less than the amount generally advised in known processes. By this, the phenomena known as superoxygenation can be avoided. In the method now described, the oxygen can in fact reach the organ both via the environmental medium of the organ and via the perfusion liquid, although it appears that the latter means is easily the most important. The use of a low oxygen content, biochemically inert gas means that the required hyperbaric pressure can be maintained without involving excess supply of oxygen to the living organ. Similarly, the oxygen concentration of the perfusion liquid is considerably reduced by using a carrier gas which is biochemically inert. By "biochemically inert" we mean a gas which has no effect on the constituents of a living organ, while by "permeation" we mean the property which a gas has to permeate through a cellular tissue wall. This second characteristic appears to be of importance, since it will be realized that the inert gas will not only serve to dissolve the oxygen in the perfusion liquid but also as the vehicle carrying both the oxygen and the carbonic gas which is formed in the tissue cells during metabolism.

For reasons of simplification, it appears obvious to employ the same gas for the limited oxygenation of the perfusion liquid as for the hyperbary of the environmental medium of the living organ. The choice of gas is in fact fairly limited and helium is the outstanding one among rare gases because of its excellent physicochemical qualities.

It has not yet been possible to determine the exact limits of suitable oxygen content, but bearing in mind that the percentage of dissolved oxygen in the blood is about 0.3 milliliters for 100 milliliters of blood, consequently about a similar percentage of oxygen, between 0.1 and 0.2 milliliters of oxygen for 100 milliliters of liquid is dissolved in the perfusion liquid at normal perfusion flow, i.e. oxygen percentages of about 1 to 5 percent in the biochemically inert gas. However, it is clear that this figure may be slightly modified without basic alteration to the survival time of the living organ, all other things being equal and within certain limits. However, superoxygenation effects may be expected once 10 percent of oxygen is reached, and other factors, such as hyperbaric pressure, refrigeration temperature, perfusion flow and the nature of the living organ, must be taken into account when deciding on the appropriate oxygen percentage.

A further aim of the present invention is that of preventing gassy embolisms, and to this end the oxygenation pressure of the perfusion liquid is always maintained below the pressure of the environmental medium of the living organ. The quantity of gas dissolved in a liquid will depend on the pressure of that gas and the temperature of the medium. Because the gas dissolved in the liquid contained in the oxygenating tank is a mixture of oxygen and an inert gas, the quantity of dissolved oxygen is always less than that which it would be at the saturation point. Since the perfusion liquid and the environmental medium of the organ are at the same temperature, the higher pressure of the environmental medium provides a higher saturation point, and there is no risk of bubble formation which would give rise to gassy embolism.

Decompression is a particularly delicate operation because of the risk of bubbles forming which would cause gassy embolisms inside the organ, so it is carried out differentially over a period of time: firstly, decompression of the gas in the oxygenating tank to atmospheric pressure, and subsequently, after complete purging of the organ, decompression of the environmental medium of the organ. By this means, degassing is achieved which is indispensable to the perfusion liquid, and it may be noted that this operation is all the more rapid when helium is employed since this gas possesses a very high desolubilization rate. During decompression of the perfusion liquid, recourse may also be taken to heating and agitating this liquid in the oxygenation tank which has the effect not only of increasing desolubilization speed but also reduces the final concentration of dissolved gas in the perfusion liquid.

The present invention also comprises an apparatus for keeping alive an organ of human or animal origin comprising in combination, a sealed vessel adapted to contain said organ, a sealed nutrient fluid container, conduit means attached to said organ and forming a closed circuit with said container including a pump for circulating the infused nutrient fluid, at least a tank of inert gas under pressure, a first conduit means for introducing said gas from said tank into said container and a second conduit means for introducing said gas into said vessel, said inert gas containing sufficient amount of oxygen for supplying the need of said organ.

Other objects, features and advantages will be apparent from the following description of the invention, defined in particularity in the appended claims, and taken in connection with the accompanying drawing in which:

The single figure is a schematic representation of an assembly of interconnected component elements representing the apparatus in accordance with the invention.

Referring to the drawing, the dotted lines 1 indicate the confines of a thermostatically controlled refrigerated enclosure which may have various forms, well known in the art, and need not be described in detail. In this enclosure, we find a vessel 2 in which the organ 3 to be kept alive is deposited. The organ 3 may be immersed in a sustaining solution 4 if necessary. The inlet to the organs arterial or venal complex is connected at 5 to a conduit which is supplied from an oxygenating, nutrient-fluid container 6. This connection includes a pump 7 having a bypass at 8 and a flexible tubing 9 and a conduit 9' which terminates near the bottom of the container 6. The tubing 9 connects, within the vessel 2, to a heat exchanger 10. The outlet of the heat exchanger 10 terminates at the lower chamber of a buffer-damper 11. The outflow from the organ 3 is effected by the conduit 13 which may have a portion of flexible tubing 14 and enters at the bottom of a constant-level tank 15. The liquid level in the latter may be regulated by conventional means 16, shown in dotted outline, having level sensors located in the tank 15 which control the valve in the return conduit. The regulation is for the purpose of maintaining substantially the same level of nutrient fluid as that of the liquid in the vessel 2 in order to avoid excessive pressure downstream the organ 3. The tank 15 may have a drain 17. The outlet from the tank 15 is connected by means of the conduit 18 to the interior of the container 6.

In order to apply the required pressure on the nutrient liquid placed in the container 6, there is introduced through the sealed top thereof a conduit 21 which extends to the valve 22, the biological filter 23 and terminates at the outlet of a pressure regulator valve 24 which, in turn, connects to the outlet of a high-pressure tank filled with helium containing, in accordance with the invention, a small amount of oxygen.

In the same manner as described above, the interior of the vessel 2 connects by means of the conduit 31, the valve 32 and biological filter 33, and conduit 34 with the pressure regulator 35 and from there with the supply tank 25.

While the invention contemplates, by way of example, the use of helium which proved effective, it is, of course, within the province of the application of the process and apparatus herein outlined to use other gases or combinations thereof, in one tank or in separate tanks for supplying the container 6 and the vessel 2.

For the replenishing of the nutrient fluid a flask 41 may be provided which, of course, must be subjected to the same environmental pressure as the pressurized container 6. This is accomplished by the conduit 42, which joins the conduit 21. The flask 41 is connected with the interior of the container 6 by means of a conduit 26 and a regulating valve 43.

Most of the component elements are of conventional design and well known in the art, and therefore no lengthy description thereof need be given. However, some are of unique design, such as the buffer-damper 11 which will be described later in more detail. Suffice it to say that the lower chamber thereof works in connection with the upper sealed chamber 44. The purpose of this device is to eliminate the formation of gas bubbles in the supply conduit and also, by virtue of the gas in the chamber 44, cushion the effect of the pulsation of the pump 7 on the liquid inflow to the organ 3.

The apparatus shown at 45 has the purpose of indicating the difference in pressure between that in the vessel 2 and in the nutrient fluid just before penetrating in the organ 3. The control of this pressure difference in effect controls the perfusion pressure of the nutrient liquid. It should be noted that suitable magnetically driven agitators are illustrated such as at 46 in the container 6 and 47 in the vessel 2.

Considering the operational features, the gas in the tank 25 may contain volumetrically 99 percent helium and 1 percent oxygen. The pressure regulator 35 is adjusted such that in the conduit 34 and therefore in the vessel 2, there should be about 5–10 bars of pressure. The pressure regulator 24 is so adjusted that the pressure in the supply container 6 should be a few bars less than that in the vessel 2.

When the pressure difference is so established, the nutrient fluid in the container 6 saturates with gas due to the agitation of the liquid. The fluid is forced by the pump 7—which, by the way, also serves as the dosage means—into the heat exchanger 10 and from there into the organ 3. Here it is separated into venal outflow and secretions such as urine in the case of a kidney.

The venal outflow is collected in the constant level tank 15 from which it is recycled back into the oxygenating container 6.

The secretions may be removed by conduit 50 into a storage vessel 51 from which it may be drained by conventional means.

Some of the component elements of note will now be described. The buffer-damper comprises two chambers. A lower chamber 11 communicates by a narrow or restricted passage with the upper sealed chamber 44. By virtue of this narrow passage, the nutrient fluid flowing toward the organ 3 will not be saturated with gas due to the pressure prevailing in the upper chamber 44. The latter may communicate by means of the conduit 60 and stop valve 61 with the interior of the vessel 2. The level of liquid in the chamber 44 is normally at the terminal end of the conduit 60 in chamber 44. Consequently, it is the gas which fills the upper part of the chamber 44 and it is this compressed gas which acts as a buffer and smooths out the pulsations of the pump 7.

The container 51 with a drainage pipe 62 is preferably placed within the vessel 2 and its upper, open end communicates with the upper part thereof.

The interior of the constant-level tank 15 is, of course, maintained at the same environmental pressure, by means of an inlet through the conduit 63 with the vessel 2. It is, in fact, the constant-level regulation which permits the recycling of the nutrient fluid through the conduit 18.

It is from the above description of the apparatus that the method of operation adds in a large measure to the survival time of the organ. Due to the lower pressure in the oxygenating container than that in the vessel containing the organ, the nutrient fluid, even if saturated, will not cause gas bubbles to be carried to the organ. The pressure difference is the important factor in this respect.

When decompression is to be considered, which as a rule is a delicate operation in that it may easily cause the formation of gas bubbles, the following steps are recommended in the practice of the invention. Decompression is to be effected in stages. First the pressure in the oxygenating container 6 is reduced until it about reaches atmospheric conditions. After that and first by complete purging of the organ, the environment within the vessel 2 is decompressed. This manner of procedure permits complete degassing of the nutrient fluid. It is to be noted that this is particularly easy when helium is used, which has a rapid desolubilization rate. This may be further aided by applying heat and agitation to the fluid in the oxygenating container.

What is claimed is:

1. In a method for keeping alive an organ of animal or human origin in which said organ is maintained in an environment having a temperature below that of 37° C. and at an elevated pressure of 2–15 bars or more while infusing and circulating in said organ a nutrient fluid, the improvement which comprises; controlling the addition of oxygen to said organ, to the extent required for keeping it alive by means of a gas under pressure containing essentially biochemically inert gas having a high permeation and an oxygen content below that of 10 percent by volume, said gas being dispersed in the infused nutrient fluid.

2. The method in accordance with claim 1, wherein the quantity of oxygen dispersed in the nutrient circulating fluid is in the order of 1/10 to 2/10 milliliter of oxygen for 100 milliliters of fluid.

3. The method in accordance with claim 1, wherein the pressure of the gas dispersed in said fluid is below that of the pressurized environment of the living organ.

4. The method in accordance with claim 1, wherein said biochemically inert gas is Helium.

5. The method in accordance with claim 1, wherein the organ is maintained at said elevated pressure by applying thereto a neutral biochemical gas having a high permeation and an oxygen content below that of 10 percent by volume.

6. The method in accordance with claim 5, wherein the gas utilized for maintaining the organ under pressure is the same as the gas dispersed in the circulating fluid.

7. The method in accordance with claim 5, wherein the gas which contains the oxygen supply for the circulating fluid is biochemically inert and has an oxygen content of about 1 percent to 5 percent.

8. In a method of keeping alive an organ of human or animal origin by maintaining said organ under refrigeration and in an environment of elevated pressure, while infusing and circulating in said organ a nourishing fluid containing oxygen, the improvement which comprises; effecting differential decompression, first by reducing the pressure of a gas carrying oxygen to the fluid to the point of bringing it back to atmospheric pressure, followed, after complete purging of the organ, by a reduction in the pressure of the environment.

9. In a method for preserving an organ, the steps of sealing the organ in an enclosed vessel, pressurizing said vessel, mixing oxygen and an inert gas in a container therefor to provide a gaseous mixture having an oxygen content not greater than about 10 percent by volume, dispersing the gaseous mixture in a nutrient fluid, maintaining said nutrient fluid under a pressure less than the pressure within said vessel during the dispersal of the gaseous mixture in said fluid, and transmitting the nutrient fluid containing the dissolved mixture to the organ within said vessel.

10. In a method for preserving an organ, the steps of sealing the organ in an enclosed vessel, maintaining the temperature within said vessel below about 37° C., pressurizing said vessel, mixing oxygen and a biochemically inert gas in a container therefor to provide a gaseous mixture having a high permeation and an oxygen content not greater than about 10 percent by volume, dispersing the gaseous mixture in a nutrient fluid, maintaining said nutrient fluid under a pressure less than the pressure within said vessel during the dispersal of the gaseous mixture in said fluid, and transmitting the nutrient fluid containing the dissolved mixture to the organ within said vessel.

11. In a method in accordance with claim 10, the vessel being pressurized with said gaseous mixture.

12. In a method for preserving an organ, the steps of sealing the organ in an enclosed vessel, maintaining the temperature within said vessel below about 37° C., mixing oxygen and helium in a container therefor to provide a gaseous mixture having a high permeation and an oxygen content between about 1.0 percent and about 5.0 percent by volume, feeding the gaseous mixture directly from its container to said enclosed vessel to pressurize said vessel, also feeding the gaseous mixture from its container to a second container having a nutrient fluid therein, dispersing the gaseous mixture in said nutrient fluid, regulating the pressure of said gaseous mixture to maintain said nutrient fluid under a pressure less than the pressure within said vessel during the dispersal of the gaseous mixture in said fluid, and transmitting the nutrient fluid containing the dissolved mixture from said second container to the organ within said vessel.